United States Patent [19]
Marfori

[11] Patent Number: 5,471,778
[45] Date of Patent: Dec. 5, 1995

[54] COLLAPSIBLE NET ASSEMBLY CAPABLE OF ROTATABLY CLOSING THE SUPPORT RODS UPON WHICH THE NET IS SUPPORTED

[75] Inventor: Eddie Marfori, Signal Hill, Calif.

[73] Assignee: Educational Insights, Inc., Dominguez Hills, Calif.

[21] Appl. No.: 71,245

[22] Filed: Jun. 2, 1993

[51] Int. Cl.⁶ .................................................. A01K 77/00
[52] U.S. Cl. ................................................................ 43/12
[58] Field of Search .............................. 43/7, 11, 12, 110

[56] References Cited

U.S. PATENT DOCUMENTS

| | | |
|---|---|---|
| 1,857,826 | 5/1932 | Slamer ........................................ 43/12 |
| 2,491,703 | 12/1949 | Bell ............................................. 43/12 |
| 3,512,291 | 5/1970 | Proulx et al. . |
| 3,579,890 | 5/1971 | Maxwell . |
| 3,645,034 | 2/1972 | Pfahler . |
| 3,715,829 | 2/1973 | Hamilton . |
| 3,815,272 | 6/1974 | Marleau . |
| 3,903,637 | 9/1975 | Dorsey . |
| 4,031,650 | 6/1977 | Popeil ......................................... 43/12 |
| 4,127,267 | 11/1978 | Bay et al. . |
| 4,207,700 | 6/1980 | Marleau . |
| 4,574,513 | 3/1986 | Wearing . |
| 4,870,773 | 10/1989 | Schmucker et al. . |
| 5,131,178 | 7/1992 | Stoliar ......................................... 43/12 |

FOREIGN PATENT DOCUMENTS

| | | | |
|---|---|---|---|
| 0626525 | 11/1926 | France ........................................ 43/12 |
| 0653265 | 3/1928 | France ........................................ 43/12 |
| 0737106 | 5/1932 | France ........................................ 43/12 |
| 0904448 | 5/1944 | France ........................................ 43/12 |
| 0921113 | 10/1945 | France ........................................ 43/12 |
| 0009804 | 5/1895 | United Kingdom ....................... 43/12 |

*Primary Examiner*—Mark Rosenbaum
*Assistant Examiner*—James Miner
*Attorney, Agent, or Firm*—Blakely, Sokoloff, Taylor & Zafman

[57] ABSTRACT

The present invention provides a collapsible net assembly having a shaft with a main body disposed at one end and two support arms rotatably coupled to opposing sides of the main body for pivotal movement of support rods, which engage the net and are mounted within the support arms, between an open position and a closed position. The opposing sides of the main body comprise inclined surfaces formed within respective planes which converge at a point along the shaft so as to define a generally V-shaped main body. In order to obtain an angular displacement between the support rods in the open position and a parallel arrangement when in the closed position, the support rods are mounted within the support arms at an angle $\alpha$ to their respective inclined surfaces. The magnitude of the angle $\alpha$ between the support rods and their inclined surfaces should be substantially equal the angular deviation of the inclined surfaces with respect to the longitudinal axis of the shaft so that a parallel arrangement can be obtained between the two support rods and the shaft when in the closed position. The net of the assembly comprises an enclosure having a perimeter defining an opening for the passage of items into the net and two sheath portions incorporated into the perimeter of the net on opposite sides of the opening for detachable engagement with the support rods.

5 Claims, 3 Drawing Sheets

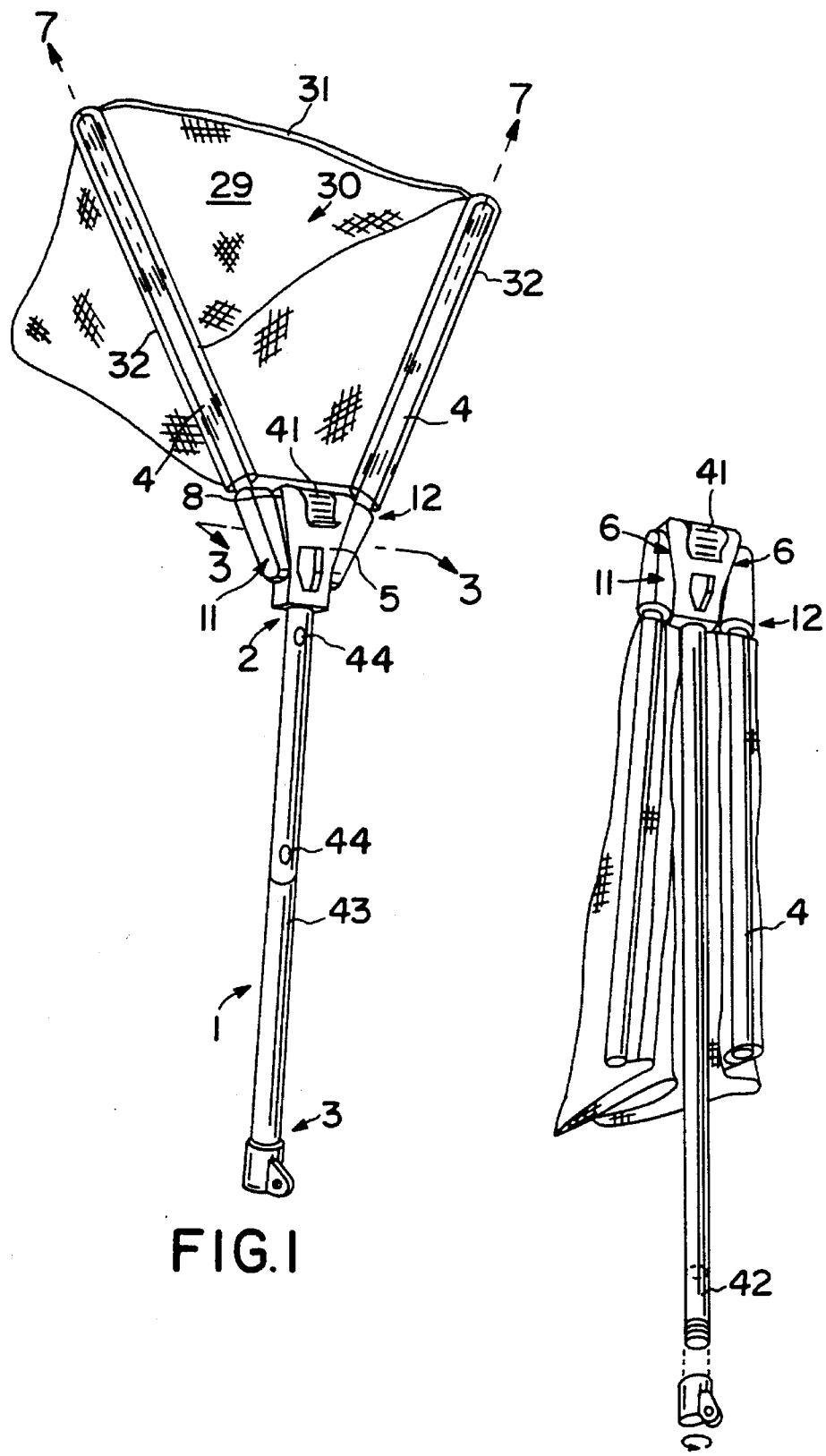

COLLAPSIBLE NET ASSEMBLY CAPABLE OF ROTATABLY CLOSING THE SUPPORT RODS UPON WHICH THE NET IS SUPPORTED

BACKGROUND OF THE INVENTION

1. Field of the Invention

The present invention relates to the field of portable nets used to catch animals, insects and the like, and more particularly, to the field of collapsible net assemblies having a shaft with a net disposed at one end thereof.

2. Prior Art

Collapsible net assemblies are in wide-spread use by sportsmen and collectors alike for the reason that the collapsibility of the nets permits easy storage and transport of the assemblies. If the support rods which hold the net in an open position cannot be collapsed or somehow reduced in size, the assembly presents a large, bulky structure which readily becomes entangled with other objects, snags on protruding structures and is almost impossible to fit into a storage compartment without significant difficulty. Hence, several types of collapsible net assemblies have been developed for reconfiguring the support rods in a manner that reduces the over-all shape and size of the assembly.

In U.S. Pat. Nos. 3,715,829 issued to Hamilton, 3,815,272 issued to Marleau and 4,870,773 issued to Schmucker et al., the net assemblies therein described each comprise support rods pivotal about a hinge or support disposed at the top of the shaft. In each case, the support rods fold together above the shaft and along its longitudinal axis to reduce the size and shape of the net. Although the net can be placed in a closed position to consolidate the as stringing of the net, the rods protruding from the top of the shaft nevertheless present an elongated structure which inhibits utilization and storage of the assembly due to the length of the assembly and the fragility of the exposed rods. In addition, those nets which rely on hinged rods are inherently weak at the hinged junction, and further require a support member disposed either at the top or the bottom of the rods to maintain the open position of the net, thereby increasing the number of parts in the assembly and the complexity of its operation.

In the net assemblies disclosed by U.S. Pat. Nos. 3,512, 291 issued to E. J. Proulx et al., 4,207,700 issued to Marleau and 4,574,513 issued to Wearing, the support rods used to support the net in the open position slide via guides downward along the body of the shaft where they are stored either on the outside or inside of the shaft. In the net assemblies disclosed by E. J. Proulx et al. and Wearing, the support rods are secured in the open position through the use of a slidable latch which engages the bottom of both rods. In the net assembly disclosed by Marleau, a insertion plug and a third rod interconnecting the two side support rods are used to maintain the arms in an open position. Although these net assemblies provide a way in which to retract the support rods upon dosing the net so as to prevent damage to the exposed support rods and to reduce the over-all length of the assembly, the means by which the support rods are slidably locked into the open position renders the assembly prone to becoming unlocked upon application of normal longitudinal and axial forces to the support rods in the dosed direction (i.e., inward and downward). For example, if the support rods of E. J. Proulx et al. and Wearing are forcefully pulled away from and then suddenly pushed toward the shaft during capture of the prey, the latch will likely become released due to the slidability of the latch in both directions. Similarly, in the assembly disclosed by Marleau, separation of the support rods from one another loosens the seating of the insertion plug within the hinged connection to where the locked arrangement of the support rods becomes unstable and the support rods are vulnerable to damage.

Accordingly, it is an object of the present invention to provide a collapsible net assembly having a minimum of movable components arranged in such a manner as to provide a sturdy configuration of the net assembly when the net is in both the open and closed positions in addition to a simple method for collapsing the support rods about the shaft of the assembly.

Another object of the present invention is to provide a net assembly which is collapsible by means of rotating the support rods about respective pivot points positioned near one end of the shaft.

A further object of the present invention is to provide a net assembly comprising a main body disposed at one end of the shaft having inclined sides and rotatable support arms coupled to the inclined sides for holding the support rods in an angular displacement to one another when in an open position and parallel to one another when in a closed position.

Yet another object of the present invention is to provide a collapsible net assembly in which the support rods are securely locked into each the open and dosed positions by means of an elastic snap fitting between the main body and the rotatable support arms which permits the support rods to be moved between the two positions by laterally extracting the support arms from the main body, rotating them by 180 degrees and inserting them back into the main body where they are secured by an elastic force.

BRIEF SUMMARY OF THE INVENTION

The present invention provides a collapsible net assembly having a shaft with a main body disposed at one end and two support arms rotatably coupled to opposing sides of the main body for pivotal movement of support rods which engage the net and are mounted within the support arms. The support arms are coupled to the opposing sides of the main body by means of a protruded cylindrical knob formed on a first side of each support arm. The knobs are inserted into corresponding apertures formed in the respective opposing sides so as to permit rotation of the support arms about pivot axis perpendicular to the respective opposing sides (and passing through the corresponding apertures).

According to a preferred embodiment, the opposing sides comprise inclined surfaces, or at least inclined surface portions, formed within respective planes which converge at a point along the shaft so as to define a generally V-shaped main body. During rotation of the support rods from the open position where the rods extend above the first end of the shaft to the closed position where the rods extend along the shaft, the first side of the support arms rotate within or parallel to the planes of the respective inclined surfaces. However, in order to obtain an angular displacement between the support rods in the open position and a parallel arrangement when in the closed position, the support rods are mounted within the support arms at an angle a to their respective inclined surfaces. The magnitude of the angle a between the support rods and their inclined surfaces should be substantially equal the angular deviation of the inclined surfaces with respect to the longitudinal axis of the shaft so that a parallel arrangement can be obtained between the two support rods and the shaft when in the closed position.

The net of the assembly comprises an enclosure having a perimeter defining an opening for the passage of items into the net and two sheath portions incorporated into the perimeter of the net on opposite sides of the opening for detachable engagement with the support rods. According to a preferred method for assembling the components of the net assembly, each of the support rods and the main body are constructed with first and second halves which are detachably coupled together by corresponding male and female fasteners. This mode of construction greatly facilitates the assembly and operation of the device by allowing the separate components of the assembly to be fitted together within each other while still permitting pivotal movement of the support arms within the main body for rotatable opening and closing of the support rods.

BRIEF DESCRIPTION OF THE DRAWINGS

The objects, features and advantages of the present invention will become apparent from the following detailed description of the preferred embodiment in which:

FIG. 1 is a front perspective view of the collapsible net assembly with the support rods in the open position and displaying a particular embodiment of the assembly having a telescopic shaft.

FIG. 2 is a front perspective view of the collapsible net assembly with the support rods in the closed position and displaying a particular embodiment of the assembly having a storage compartment disposed in the shaft.

DETAILED DESCRIPTION OF THE INVENTION

Figure 3:
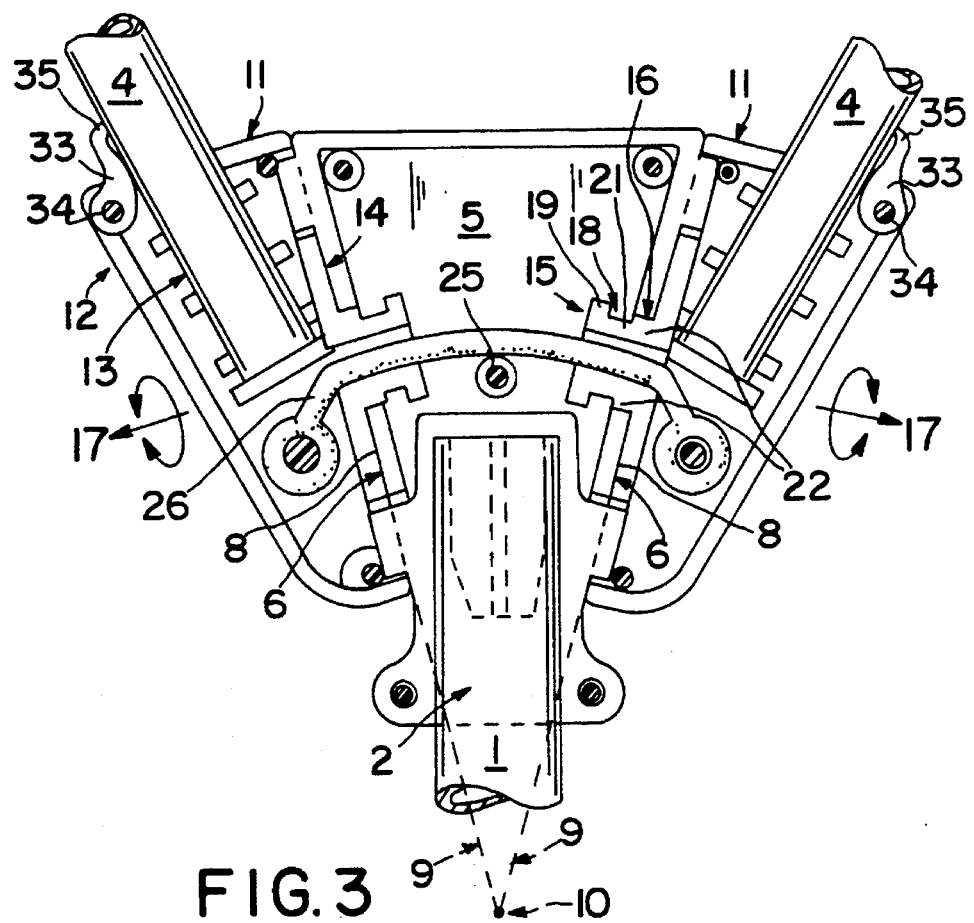
FIG. 3 is a frontal, cross-sectional view of the main body and support arms of the assembly showing the manner in which the support arms are coupled to the main body.

The present invention provides a collapsible net assembly comprising a shaft 1 with a main body 5 disposed at one end thereof, the main body 5 having inclined sides 8 and support arms 11 rotatably coupled to the inclined sides 8 for pivoting the support rods 4 between an open position where they extend above the end of the shaft and a closed position where they extend along the shaft 1 and are parallel to one another. In the following description, numerous details such as specific materials, structures and relationships are set forth in order to provide a more complete understanding of the present invention. However, it is understood by those skilled in the art that the present invention can be practiced without these specific details. In other instances, well-known structures, components, fasteners and the like are not set forth in detail in order to avoid unnecessarily obscuring the present invention.

As shown in FIG. 1, the collapsible net assembly of the present invention comprises an elongated shaft 1 for use as a handle having a main support body 5 attached to the first end 2 of the shaft 1 for support of the support rods 4 which engage the net 29. The shaft 1 itself may be made out of wood, plastic, metal or the like, and is preferably made as two hollow portions 43,46 having diameters of different sizes for telescopically collapsing one portion 43 of the shaft within the other portion 46. For this purpose, two spring-activated buttons 44 are provided on the upper hollow portion 46 for locking engagement with two corresponding apertures on the lower telescoping portion 43 so as to lock the shaft 1 in either a protracted or retracted position. Additionally, as shown in FIG. 2, the shaft 1 may be adapted with a hollow storage compartment 42 in the second end 3 of the shaft 1 which compartment 42 is closed by the use of a corresponding screw cap 45 for storage of personal items or the net 29 when the assembly is being transported.

For rotatably coupling the support rods 4 of the assembly to the shaft 1, a main body 5 is provided on the first end 2 of the shaft 1 with two opposing sides 6 for attachment of a support arm 11 to each opposing side 6. The support arms 11 are adapted with a reception slot 13 for mounting of the support rods 4 therein by means of an adhesive or a fastener such as corresponding screw members, damp members, latches and the like. The support arms 11 are further coupled to the opposing sides 6 of the main body 5 by means of a protruded cylindrical knob 15 formed on a first side 14 of each support arm 11. The knobs 15 are inserted into corresponding apertures 16 formed in the respective opposing sides 6 so as to permit rotation of the support arms 11 about pivot axis 17 perpendicular to the respective opposing sides 6 (and passing through the corresponding apertures 16) while retaining their first sides 14 proximate to or flush with their respective opposing sides 6. With reference to FIG. 3, each knob 15 is preferably constructed with an annular recess 18 formed between the first side 14 of the support arm 11 and an annular lip 19 disposed at a distal end of the knob 15 so as to provide a cylindrical neck portion 21 of the knob 15 which passes through the corresponding aperture 16 on an opposing side 6.

In order to secure the support rods 4 in either of the open or closed positions, the knob 15 of each support arm 11 is further adapted with first and second flanges 22 formed on opposite sides of the neck portion 21 for corresponding engagement with notches formed in a perimeter of the aperture 16 of the respective opposing side 6. The first and second flanges 22 extend approximately half way from the first side 14 of the support arm 11 toward the annular lip 19 of the knob 15 so as to prevent the support arm 11 from rotating about the pivot axis 17 when its first side 14 is directly adjacent to the inclined surface 8 and the flanges 22 are disposed within their corresponding notches. To release the support arm 11 from its locking engagement with the opposing side 6, all that is required is to separate its first side 14 from the surface of the opposing side 6 such that the flanges 22 are removed from the notches and the remaining cylindrical neck portion 21 of the knob 15 is free to rotate within the aperture 16.

Additionally, an elastic band or spring member 26 can be implemented to bias the support arms 11 towards a central point 25 of the main body 5 in order to maintain the support arms 11 in a rotatably locked position directly adjacent to the opposing sides 6 of the main body 5. This is accomplished by coupling first and second ends of the elastic band or spring member 26 to the first and second support arms 11, respectively, and passing the elastic band or spring member 26 through the apertures 16 of the main body 5 and the knobs 15 of the support arms 11. The support rods 4 can then be rotated about their pivot axis 17 by pulling the support arms 11 away from their opposing sides 6 in the direction of their pivot axis 17.

According to a preferred embodiment, as best shown in

Figure 5:
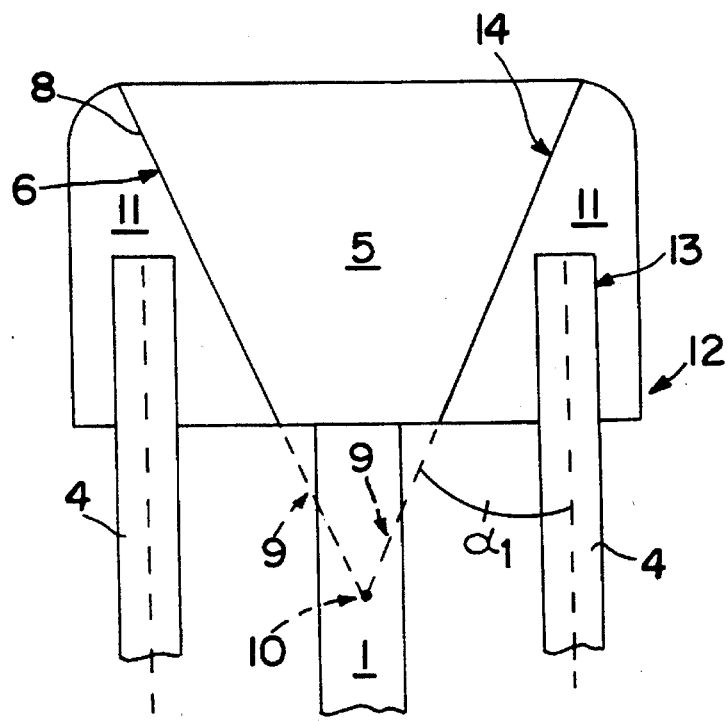
FIG. 5 is a schematic, cross-sectional view of the main body and support arms of the assembly in the closed position showing the angular relationships therebetween.
Figure 6:
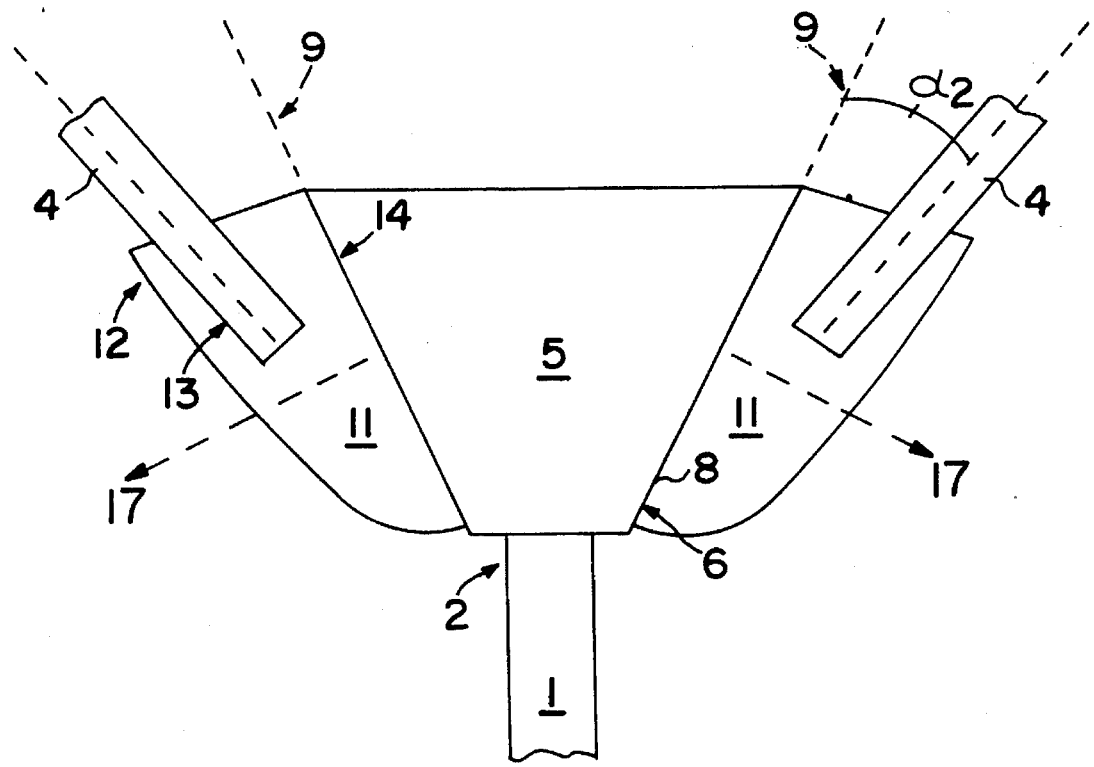
FIG. 6 is a schematic, cross-sectional view of the main body and support arms of the assembly in the open position showing the angular relationships therebetween.

FIGS. 3, 5 and 6, the opposing sides 6 comprise inclined surfaces 8, or at least inclined surface portions 8, formed within respective planes 9 which converge at a point 10 along the shaft 1 so as to define a generally V-shaped main body 5. However, the main body 5 may comprise many different over-all shapes as long as inclined surface portions 8 are provided within the opposing sides 6 of the main body 5 for reception of the first side 14 of the support arms 11. During rotation of the support rods 4 from the open position where the rods 4 extend above the first end 2 of the shaft 1 to the closed position where the rods 4 extend along the shaft 1, the first side 14 of the support arms 11 rotate within or parallel to the planes 9 of the respective inclined surfaces 8. However, so as to obtain an angular displacement between the support rods 4 in the open position and a parallel arrangement when in the closed position, the support rods 4 are mounted within the support arms 11 at an angle α to their respective inclined surfaces 8. The magnitude of the angle α between the support rods 4 and their inclined surfaces 8 should be substantially equal to the angular deviation of the inclined surfaces 8 with respect to the longitudinal axis of the shaft 1 so that a parallel arrangement can be obtained between the two support rods 4 and the shaft 1 when in the closed position.

For example, assuming that a first angle of 30° exists between the longitudinal axis of the shaft 1 and the inclined surfaces 8, the support rods 4 should be disposed at a second angle of 30° from their respective planes 9 defining the inclined surfaces 8. In this manner, the support rods 4 would be displaced from one another by a total angle of 120° when in the open position and would be parallel to the shaft when in the closed position. However, as would be obvious to one skilled in the art, the angular relationship between the support rods 4 in both the open and closed positions may be obtained without the use of the aforementioned main body 5 and support arms 11. All that is required is that the coupling of the support rods 4 to the shaft 1 have the same angular relationships as described above, which coupling may consist of, for example, a bolt, screw or the like. The coupling member would be mounted to the shaft 1 along the pivot axis 17 so as to form a first angle of (α+90°) between the shaft 1 and the coupling member and mounted to the support rod 4 at a second angle of α between the coupling member and the longitudinal axis of the support rod 4.

According to the preferred embodiment, the net 29 of the assembly comprises an enclosure having a perimeter 31 defining an opening 30 for the passage of items into the net 29 and two sheath portions 32 incorporated into the perimeter 31 of the net 29 on opposite sides of the opening 30 for reception of the first and second support rods 4. In this way, the net 29 is easily detachable from the support rods 4 simply by removing the support rods 4 from their respective sheaths 32 of the net 29 when the support rods 4 are in the closed position. Furthermore, a rotatable hook or latch 33 is also provided for engaging and securing the net 29 when the support rods 4 are inserted into the sheaths 32. Each hook 33 has a first end 34 rotatably mounted to a respective support arm 11 and a second curvilinear end 35 biased in a contactual relationship with the respective support rod 4 for engaging a portion of the net 29 proximate to the support arm 11.

Figure 4:
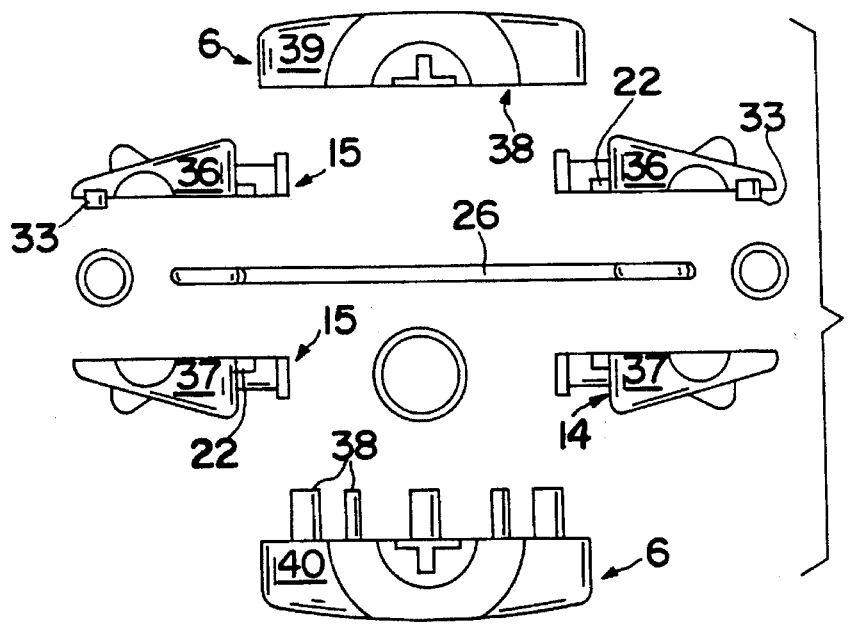
FIG. 4 is a top plan view of the sub-components forming the main body and support arms of the assembly.

According to a preferred method for assembling the components of the net assembly as shown in FIG. 4, each of the support rods 4 and the main body 5 are constructed with first and second halves 36,37 and 39,40 which are detachably coupled together by corresponding male and female fasteners 38. This mode of construction greatly facilitates the assembly and operation of the invention by first permitting the ends of the elastic strap 26 to be easily coupled to fasteners in each of the support arms 11. Once the elastic strap 26 is mounted to the support arms 11, the support rods 4 are placed in position and the two halves of each support arm 36,37 are connected to secure both the strap 26 and the rods 4 therein. Finally, the two halves 39,40 of the main body are then coupled together around the knobs 15 of each support arm 11 with the shaft 1 disposed in its proper position to obtain the final product.

While the invention has been described in conjunction with the preferred embodiment, it is evident that numerous alternatives, depictions, variations and uses will be apparent to those skilled in the art in light of the foregoing description. For example, a plurality of support rods 4 may be used with a variety of net configurations 29 for adapting the invention to a particular use. Similarly, the assembly may comprise a variety of adaptive features for facilitating use of the assembly, such as the attachment of a belt clip 41 to one face of the main body 5 to assist in carrying the lightweight and compact structure.

I claim:

1. A collapsible net assembly having a shaft with support rods disposed at a first end of the shaft for support of a net between the support rods, the assembly comprising:

a main body attached to the first end of the shaft comprising opposing sides with each opposing side having an inclined surface portion formed within a plane, the respective planes of the inclined surface portions converging at a predetermined point located along the shaft each inclined surface having a notch;

a pair of knobs pivotally connected to said main body, said knobs each having a flange that is received by said main body notches to selectively prevent and permit rotation of said knobs about a pivot axis;

a pair of first and second support arms that are attached to said knobs, said support arms each having a first and second support rod, respectively, extending therefrom, the support arms being rotatably coupled to a respective inclined surface portion of the main body for rotation about a pivot axis perpendicular to the inclined surface portion to move the support rods between an open position where the support rods extend above the main body with an angular displacement between the support rods, and a closed position where the support rods extend below the main body and are substantially parallel to one another, wherein each of the support arms and the main body comprise first and second halves detachably coupled together by corresponding male and female fasteners, with the first and second halves of the support arms being interposed between the first and second halves of the main body when coupled together; and, a net attached to the support rods.

2. The collapsible net assembly of claim 1, wherein the support arms are held adjacent to the inclined surface portions of their respective opposing sides by an elastic force biasing the support arms towards a central point of the main body to maintain the support arms in a rotatably locked position such that the support arms must be pulled away from their respective opposing sides to disengage the flanges from their corresponding notches for rotation of the support arms.

3. The collapsible net assembly of claim 2, wherein the elastic force is provided by an elastic band having a first end coupled to the first support arm and a second end coupled to the second support arm, the elastic band passing through the knobs of the support arms and through the main body.

4. The collapsible net assembly of claim 1, wherein the net comprises an enclosure having an opening for passage of items into the net, the opening of the net having a perimeter with a sheath disposed on opposite sides of the opening for reception of the first and second support rods, respectively.

5. The collapsible net assembly of claim 1, wherein the assembly further comprises a hook mounted on each support arm for securing the net on the support rods, each hook having a first end rotatably mounted on the respective support arm and a second curvilinear end biased in a contactual relationship with the respective support rod to engage a portion of the net proximate to the support arm.

* * * * *